United States Patent
Ando

(10) Patent No.: US 9,839,982 B2
(45) Date of Patent: Dec. 12, 2017

(54) MAIN SPINDLE LOAD MONITORING DEVICE FOR MACHINE TOOL

(71) Applicant: Okuma Corporation, Niwa-Gun (JP)

(72) Inventor: Tomoharu Ando, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/182,759

(22) Filed: Jun. 15, 2016

(65) Prior Publication Data

US 2017/0001279 A1    Jan. 5, 2017

(30) Foreign Application Priority Data

Jul. 1, 2015  (JP) .................................. 2015-132933

(51) Int. Cl.
| | |
|---|---|
| G01L 3/00 | (2006.01) |
| B23Q 17/09 | (2006.01) |
| G01M 13/04 | (2006.01) |
| G01M 13/00 | (2006.01) |

(52) U.S. Cl.
CPC ...... *B23Q 17/0961* (2013.01); *B23Q 17/0957* (2013.01); *G01M 13/00* (2013.01); *G01M 13/04* (2013.01)

(58) Field of Classification Search
CPC .. G01M 13/04; G01M 13/00; B23Q 17/0957; B23Q 17/0995; B23Q 17/0961; G01N 19/02
USPC ..................................................... 73/862.08
See application file for complete search history.

(56) References Cited

U.S. PATENT DOCUMENTS

| 5,428,556 A | 6/1995 | Torizawa et al. |
|---|---|---|
| 2010/0030348 A1* | 2/2010 | Scherer ............ G05B 19/4062 700/70 |
| 2012/0109539 A1* | 5/2012 | Hasegawa .......... B23Q 17/008 702/34 |
| 2014/0338468 A1* | 11/2014 | Ogawa .............. B23Q 17/0957 73/862.041 |
| 2015/0051846 A1* | 2/2015 | Masuya ................ G01M 13/04 702/34 |
| 2016/0091393 A1* | 3/2016 | Liao .................. B23Q 17/0995 702/34 |

FOREIGN PATENT DOCUMENTS

| JP | 58-120455 A1 | 7/1983 |
|---|---|---|
| JP | 05-329748 A1 | 12/1993 |
| JP | 07-024694 A1 | 1/1995 |

* cited by examiner

*Primary Examiner* — Max Noori
(74) *Attorney, Agent, or Firm* — Burr & Brown, PLLC

(57) ABSTRACT

A main spindle load monitoring device indicates a main spindle load in a machine tool that includes a tool with a plurality of edges on a main spindle and performs a process of a workpiece while the tool rotates with the main spindle. The main spindle load monitoring device includes a main spindle load detecting unit configured to detect a load on the main spindle, a main spindle load conversion unit, and a display control unit. The main spindle load conversion unit is configured to convert a time course of the main spindle load detected by the main spindle load detecting unit into a change of the main spindle load with respect to a main spindle rotation angle. The display control unit is configured to indicate a value of the main spindle load converted by the main spindle load conversion unit on a display screen in a polar coordinates system.

4 Claims, 9 Drawing Sheets

MAIN SPINDLE LOAD MONITORING DEVICE FOR MACHINE TOOL

BACKGROUND

This application claims the benefit of Japanese Patent Application Number 2015-132933 filed on Jul. 1, 2015 the entirety of which is incorporated by reference.

TECHNICAL FIELD

The disclosure relates to a main spindle load monitoring device for monitoring a load on a main spindle in a machine tool that performs a process of a workpiece while a tool mounted on the main spindle rotates.

RELATED ART

In a machine tool that performs a cutting process of a workpiece with rotating tool, a damage of the tool causes a processing failure where the workpiece cannot be processed in a desired shape. Additionally, if an axis feeding continues to be operated in a condition where the workpiece cannot be removed because of the damage of the tool, the tool is likely to collide with the workpiece to damage the machine. To avoid the damages, there is a typical method where a load on a main spindle motor, which is considered to best represent the state of the tool, is indicated on a monitor of an NC system (numerical control system) to allow a machine operator to determine the quality of the cutting state, a method where the machine monitors the main spindle load to halt the axis feeding, or a similar method.

For example, Japanese Unexamined Patent Application Publication No. 58-120455 discloses a method that employs a bar graph, in which bars are color-coded in specific regions corresponding to load values, for indicating the load on the main spindle motor on a display unit in analog form. In this method, the state of the load is intuitively grasped by colors. Japanese Unexamined Patent Application Publication No. 5-329748 discloses a tool life predictor that obtains an average value of a processing load using a cutting dynamometer and sets an allowable range of a load change to output an abnormal signal when the processing load exceeds the allowable range. From the number of an output of the abnormal signal, it is determined whether or not the processing load has remarkably changed. Japanese Unexamined Patent Application Publication No. 7-24694 discloses a load monitoring method where a tool abrasion is determined with an average value of a value obtained by subtracting a current value in acceleration and deceleration from the load current value of a main spindle motor. In this method, an upper and lower limit of the current value is set and the average value is compared with the values of the upper and lower limit, so that the abnormality is determined to output a message on a monitor.

While the load display of the main spindle motor disclosed in Japanese Unexamined Patent Application Publication No. 58-120455 has an advantage where the magnitude of the load value can be determined by the colors, there is no relation between the color and the state of the tool. Therefore, it is necessary for a machine operator to preliminarily understand that which color indicates the damage of the tool. Typically, the main spindle load varies in the acceleration and deceleration of the main spindle, the instantaneous increasing of the load in processing, or similar state. On the other hand, a changed amount of the load on the main spindle motor caused by the change of the state of the tool is very small. Therefore, it is difficult to read the change with the bar graph.

In Japanese Unexamined Patent Application Publication No. 5-329748, while the load fluctuation is necessary to be preliminarily set to determine the tool abnormality, it is difficult to set the value in processing a product for the first time, for example. As well as Japanese Unexamined Patent Application Publication No. 5-329748, Japanese Unexamined Patent Application Publication No. 7-24694 requires the current value for determining abnormality to be preliminarily set.

Therefore, it is an object of the present disclosure to provide a main spindle load monitoring device for machine tools in which a processing load and a similar load are necessary to be preliminarily set and a state of a load on a main spindle is easily grasped.

SUMMARY

In order to achieve the above-described object, there is provided a main spindle load monitoring device according to a first aspect of the disclosure. The main spindle load monitoring device indicates a main spindle load in a machine tool that includes a tool with a plurality of edges on a main spindle and performs a process of a workpiece while the tool rotates with the main spindle. The main spindle load monitoring device includes a main spindle load detecting unit, a main spindle load conversion unit, and a display control unit. The main spindle load detecting unit is configured to detect a load on the main spindle. The main spindle load conversion unit is configured to convert a time course of the main spindle load detected by the main spindle load detecting unit into a change of the main spindle load with respect to a main spindle rotation angle. The display control unit is configured to indicate a value of the main spindle load converted by the main spindle load conversion unit on a display screen in a polar coordinates system.

In the main spindle load monitoring device according to a second aspect of the disclosure, which is in the first aspect of the disclosure, the main spindle load conversion unit normalizes the change of the main spindle load with respect to the main spindle rotation angle, develops the normalized change of the main spindle load by Fourier series to exclude a zero-order component and a primary component, and extracts the Fourier coefficient of the primary component and the Fourier coefficient of an n-order component as the number of edge. The display control unit indicates the Fourier coefficient of the primary component as an index of the runout of the tool, and the Fourier coefficient of the n-order component as an index of damage of the edge on the display screen.

The main spindle load monitoring device according to a third aspect of the disclosure, which is in the first or the second aspect of the disclosure, includes a storage unit that sequentially stores values of the main spindle load of the polar coordinates system, and the display control unit indicates a plurality of the stored main spindle loads while overlapping on the display screen.

The main spindle load monitoring device according to the first aspect of the disclosure eliminates the necessity to obtain the processing load by a test cutting in advance. Further, as the change of the main spindle load is indicated with the polar coordinates, the state of the load on the main spindle is visually recognized with ease.

With the main spindle load monitoring device according to the second aspect of the disclosure, in addition to the above-described effect, the degrees of the runout and the damage of the tool can be indicated by numerical values, which can be used for the determination whether or not the process of this time is performed normally.

With the main spindle load monitoring device according to the third aspect of the disclosure, in addition to the above-described effect, a plurality of the results can be simultaneously indicated in one polar coordinates system for grasping of a change of the state by the time course and similar change.

DETAILED DESCRIPTION

The following describes an embodiment according to the disclosure based on the drawings.

Figure 1:
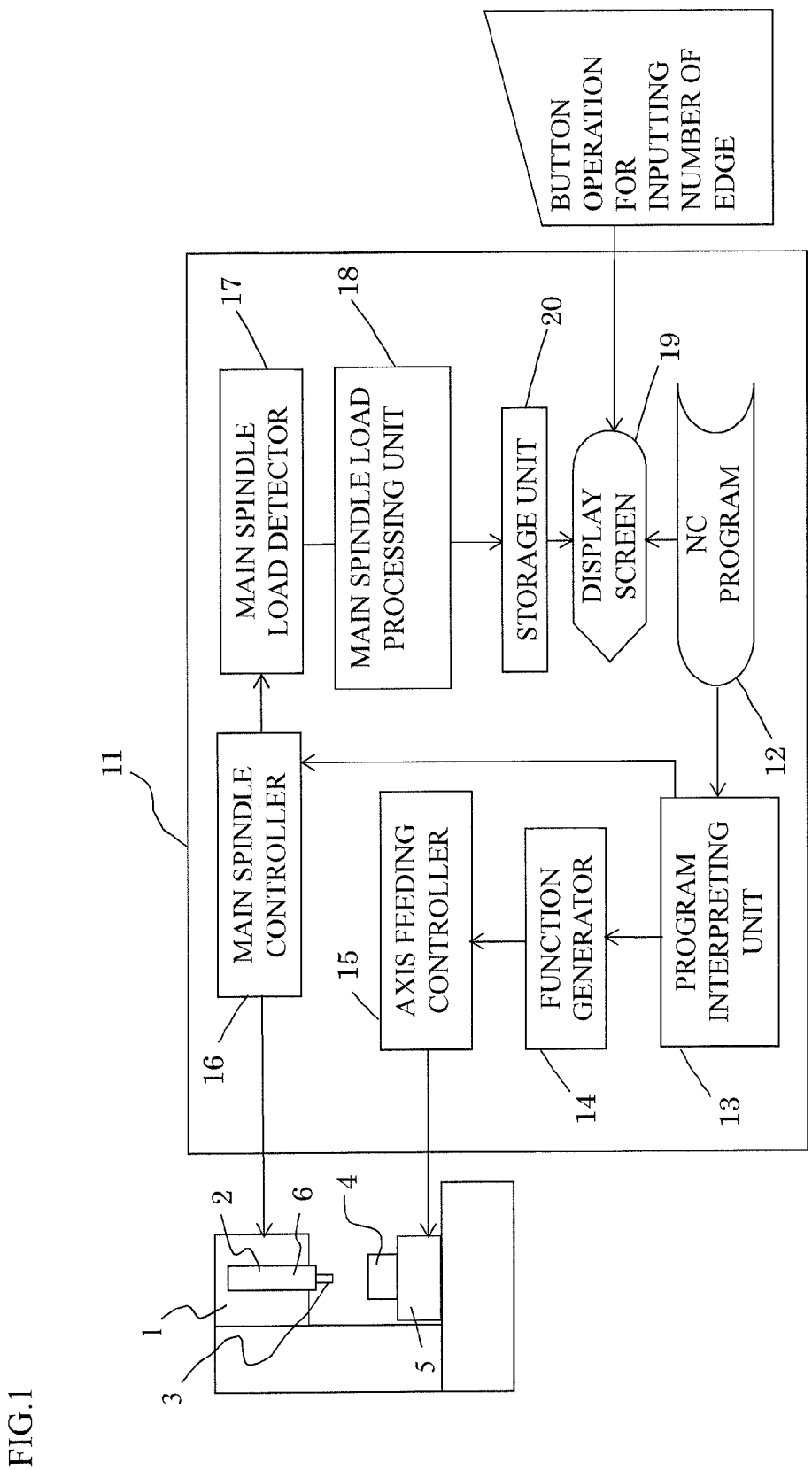
FIG. 1 is a block configuration diagram illustrating a machine tool.

FIG. 1 is a block configuration diagram illustrating an exemplary machine tool. The machine tool includes a main spindle housing 1 that includes a main spindle 6. The main spindle 6 is configured to be rotated by a main spindle motor 2. The main spindle 6 includes a tool 3 mounted on the distal end. The machine tool includes a table 5 onto which a workpiece 4 is fixed. As the table 5 is moved, the tool 3 and the workpiece 4 are relatively moved to perform a process of the workpiece 4.

An NC system (numerical control system) 11 is a system for controlling the machine tool. The NC system 11 uses a stored NC program 12 to cause the machine to be operated for processing the workpiece 4. The NC system 11 also functions as a main spindle load monitoring device according to the disclosure.

In the NC system 11, the NC program 12 is executed at the program interpreting unit 13 to interpret a machine control instruction, a target position command and a feed rate command for the axis feeding controller 15 are transferred to the function generator 14, and a command of a rotation speed is output to the main spindle controller 16. The axis feeding controller 15 controls axis feeding of the main spindle 6 and the table 5. The main spindle controller 16 controls the main spindle 6.

A main spindle load detector 17 is a main spindle load detecting unit. The main spindle load detector 17 is coupled to the main spindle controller 16, and detects a load signal (main spindle load) corresponding to a required electric power or a required torque of the main spindle motor 2 with a main spindle rotation angle. A main spindle load processing unit 18, as a main spindle load conversion unit and a display control unit, converts a detected time course of the main spindle load to a change of the main spindle load with respect to the main spindle rotation angle, and performs a processing to develop the converted main spindle load by Fourier series to cut off components by specific degrees and a processing to extract Fourier coefficients of specific degrees. The main spindle load processing unit 18 prepares a main spindle load monitor screen for indicating it on a display screen 19 to store in a storage unit 20. The display screen 19 includes a touchscreen configured to receive an input of the number of edges used in the main spindle load processing unit 18 and a change operation of the main spindle load monitor screen.

Figure 2:
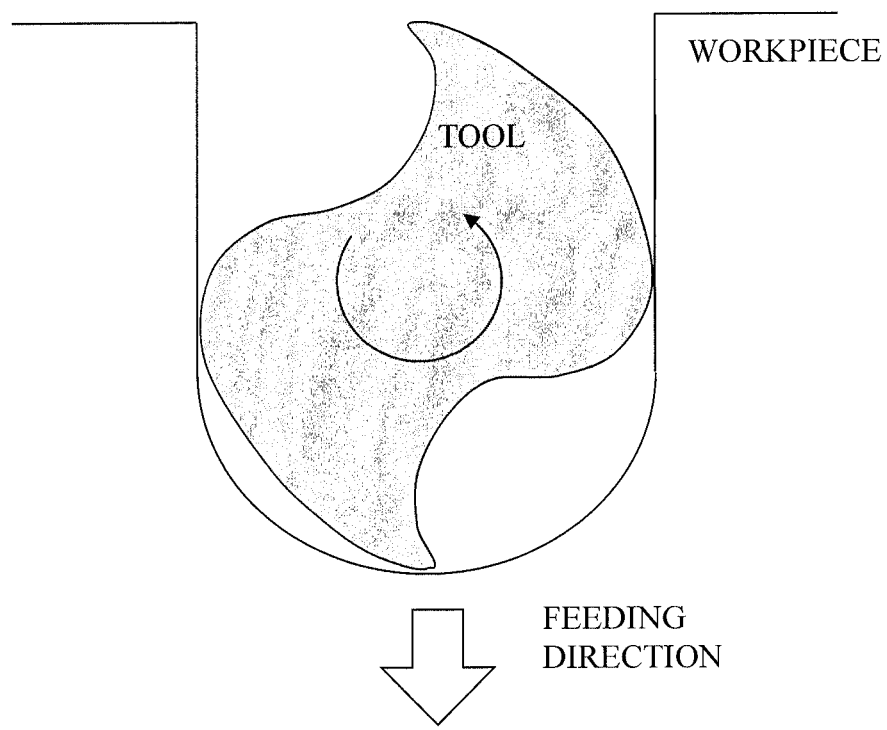
FIG. 2 is a cross-sectional view illustrating a groove processing with an end mill.
Figure 3:
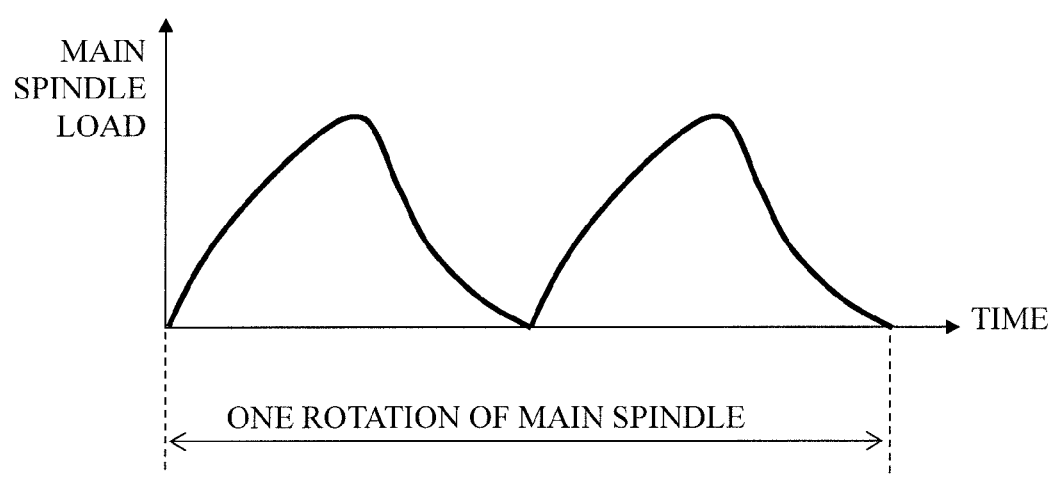
FIG. 3 is a schematic drawing illustrating a time course of a main spindle load in a normal tool.
Figure 4:
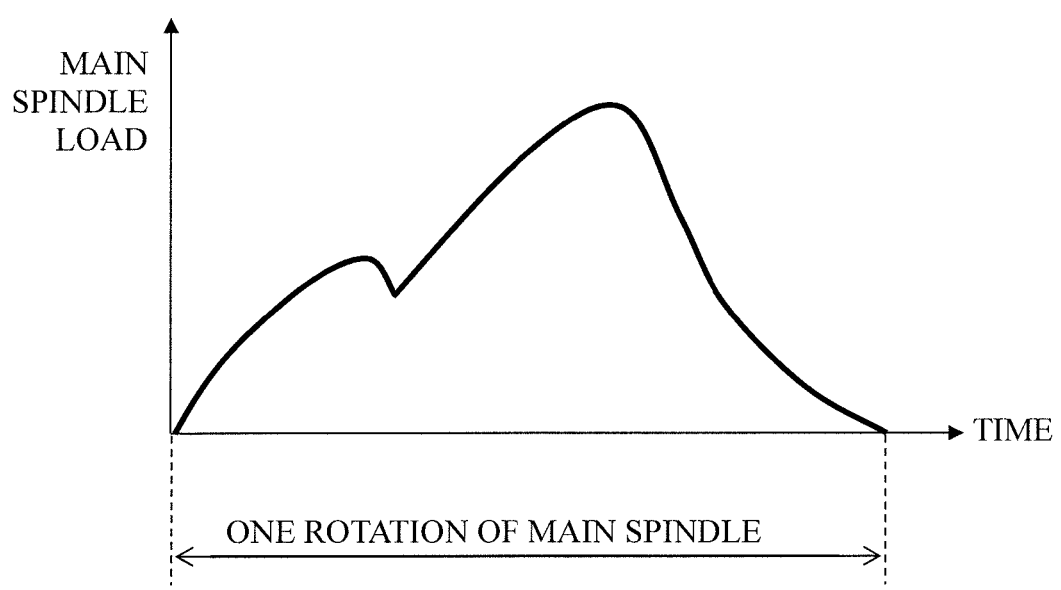
FIG. 4 is a schematic drawing illustrating a time course of a main spindle load in a tool with runout.

Here, a description will be given of the main spindle load generated in the process by referring to FIG. 2 to FIG. 5. FIG. 2 is a schematic diagram illustrating a performance of a groove processing with an end mill of two edges. As the table 5 onto which the workpiece 4 is fixed is operated, the end mill mounted on the main spindle 6 is moved in a feed direction in FIG. 2 while being rotated. Thus, a groove with a diameter of the end mill is formed on the workpiece 4. While the main spindle 6 rotates once, the main spindle load is increased and decreased twice as shown in a two mountain shape because the end mill includes two edges (FIG. 3).

However, there is a displacement between the rotational center of the main spindle 6 and the center of the outer diameter of the end mill actually. Therefore, runout of the end mill is generated with respect to the rotation of the main spindle 6. Accordingly, as illustrated in FIG. 2, in the case of the end mill with two edges, while one edge cuts out the workpiece by small amount, the other one edge cuts out the workpiece by large amount. This makes a waveform with a difference in the main spindle load illustrated in FIG. 4. Then, in the case where the runout amount is large, or in the case where the damage of the one edge progresses, the main spindle load is increased and decreased once as shown in a mountain shape in FIG. 5.

Figure 5:
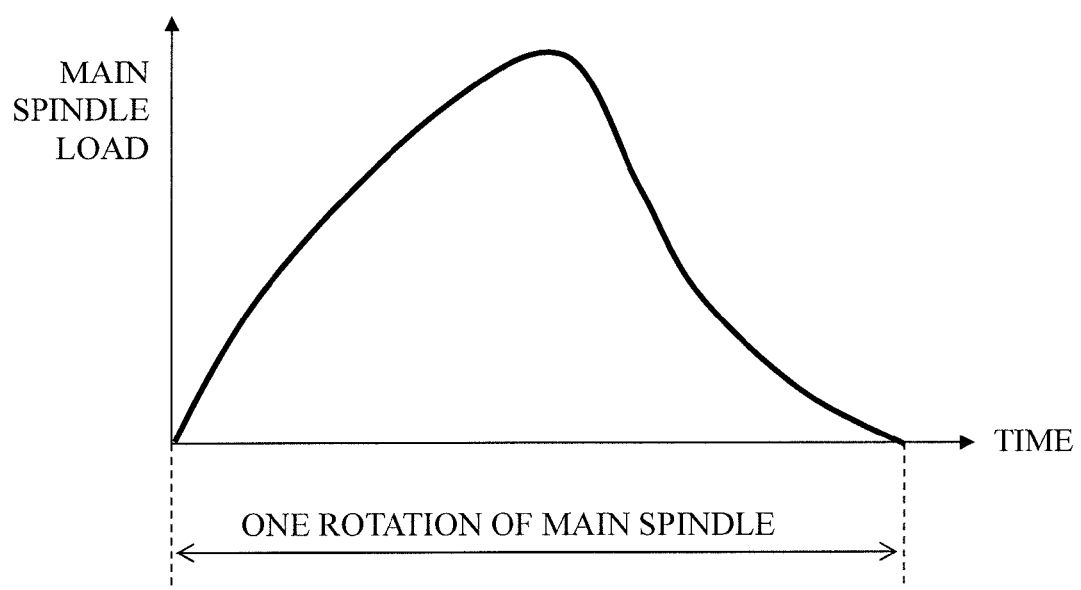
FIG. 5 is a schematic drawing illustrating a time course of a main spindle load in a tool with runout that has one cutting edge because of the damage.
Figure 6:
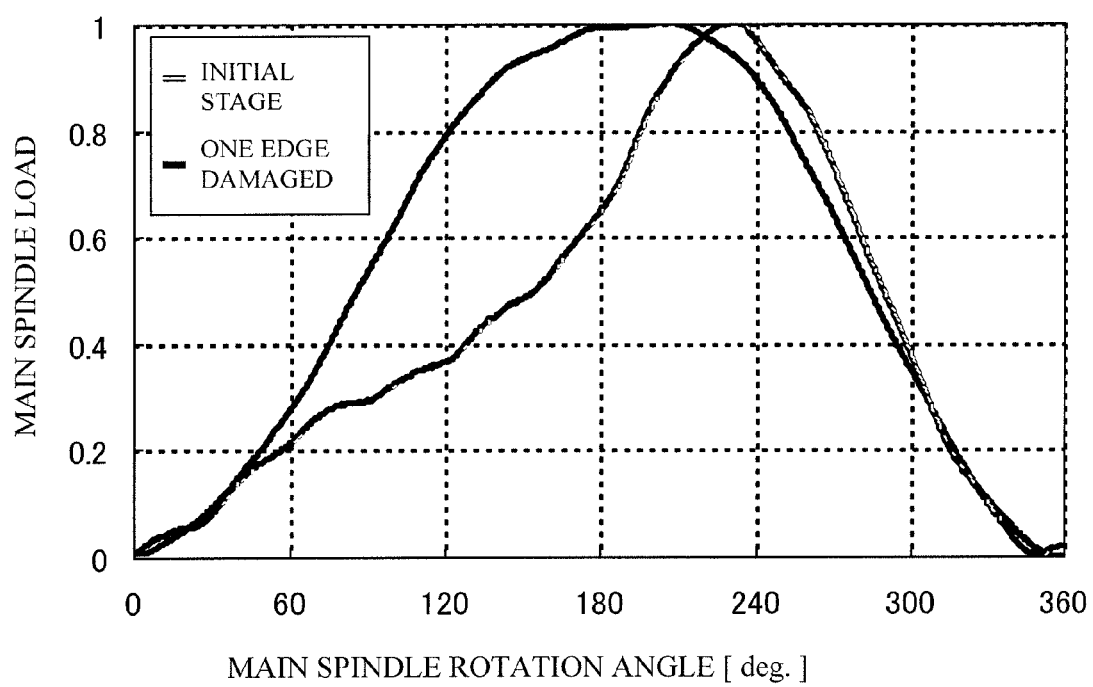
FIG. 6 is a measurement drawing illustrating a changed amount of the main spindle motor load in a main spindle rotation angle normalized by one.
Figure 7:
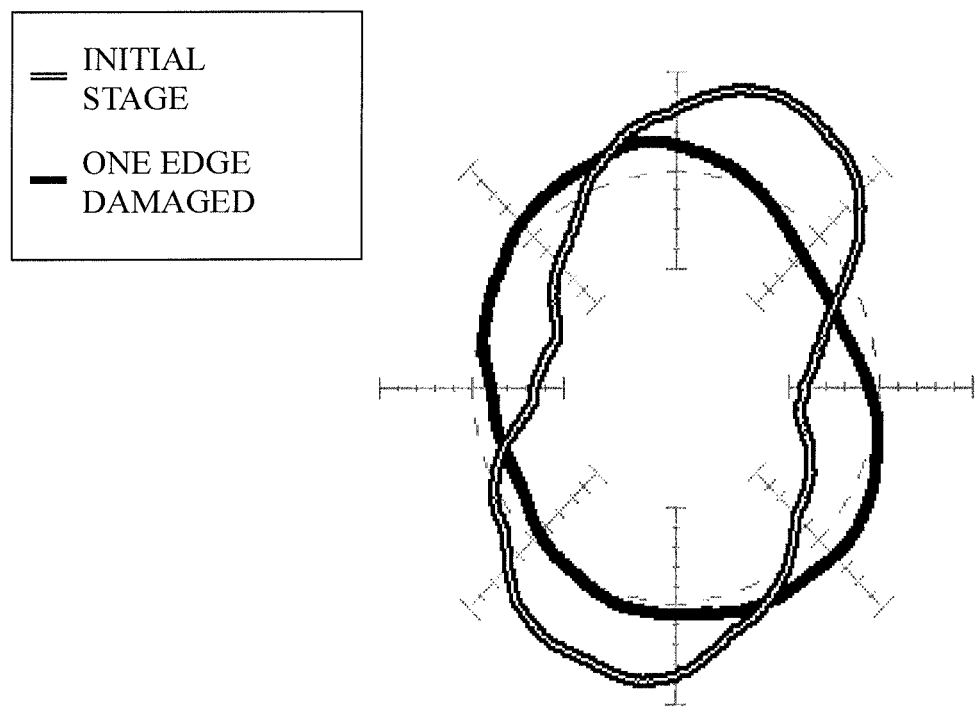
FIG. 7 is an explanatory drawing illustrating an exemplary changed amount of the main spindle motor load indicated by polar coordinates.

FIG. 6 illustrates an initial relation between the main spindle load and the main spindle rotation angle and a relation between the main spindle load and the main spindle rotation angle when the one edge is damaged by continuing of the process, in an actual process. Here, the changed amount is normalized in one for easy comparison of the main spindle load. FIG. 6 indicates that the actual main spindle load is increased and decreased once in a mountain shape as illustrated in FIG. 5 if the damage progresses. FIG. 7 illustrates polar coordinates indicating the relation between the main spindle load and the main spindle rotation angle illustrated in FIG. 6. The relation illustrated in FIG. 6 is developed by Fourier series and excludes a zero-order component and a primary component to indicate the polar coordinates in FIG. 7. FIG. 7 indicates that an initial load shows an elliptical shape including a secondary component because of the process with the end mill of two edges. On the other hand, when the one edge is damaged, the load shows a circular shape similar to the process with the end mill of one edge. Accordingly, when the cutting edge is normal, the load shows an elliptical shape to correspond to an actual image of the end mill of two edges. Similarly, in the case of the end mill of three normal edges, the load is increased and decreased three times as shown in a three mountain shape, and in the case of the end mill of n normal edges, the load shows n increasing and decreasing as shown in an n mountain shape. In the case where the edge is damaged to be equivalent to the case where the edge is reduced, the load increases corresponding to the decrease of the edge. Then, the changed amount of the main spindle load is normalized in one for easy comparison of the waveform of the load before and after the damage of the edge.

Figure 8:
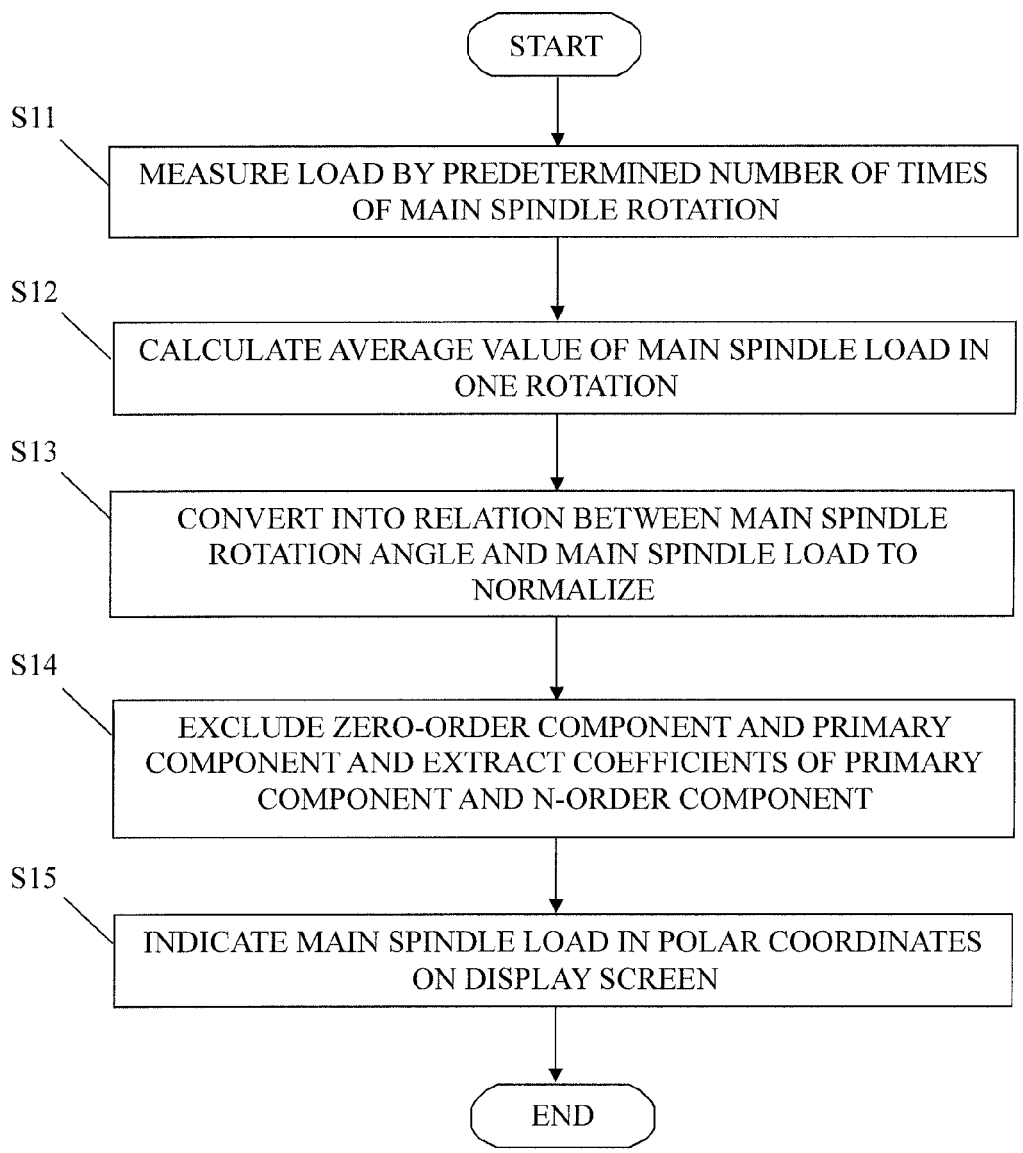
FIG. 8 is a flowchart illustrating a calculation processing until indicating of the main spindle motor load.

Next, a description will be given of a production procedure of the main spindle load indicated by polar coordinates illustrated in FIG. 7 by the main spindle load processing unit 18 based on a flowchart in FIG. 8.

First, the main spindle load processing unit 18 measures the load by a predetermined number of times of the rotation of the main spindle (S11). Next, the main spindle load processing unit 18 averages the measured loads in one rotation of the main spindle (S12). Then, the main spindle load processing unit 18 converts the averaged load into a relation between the main spindle rotation angle and the main spindle load, and normalizes the load in the maximum value of the changed amount to obtain the result illustrated in FIG. 7 (S13). The main spindle load processing unit 18 develops the result by Fourier series to exclude a zero-order component and a primary component, and extracts a Fourier coefficient of the primary component and a Fourier coefficient of an n-order component (n means the number of the edge) (S14). The main spindle load as the polar coordinates indication, the Fourier coefficient of the primary component as an index of the runout of the tool and the Fourier coefficient of the n-order component as an index of the damage of the cutting edge are recorded in the storage unit 20 and are indicated on the display screen 19 (S15).

Figure 9:
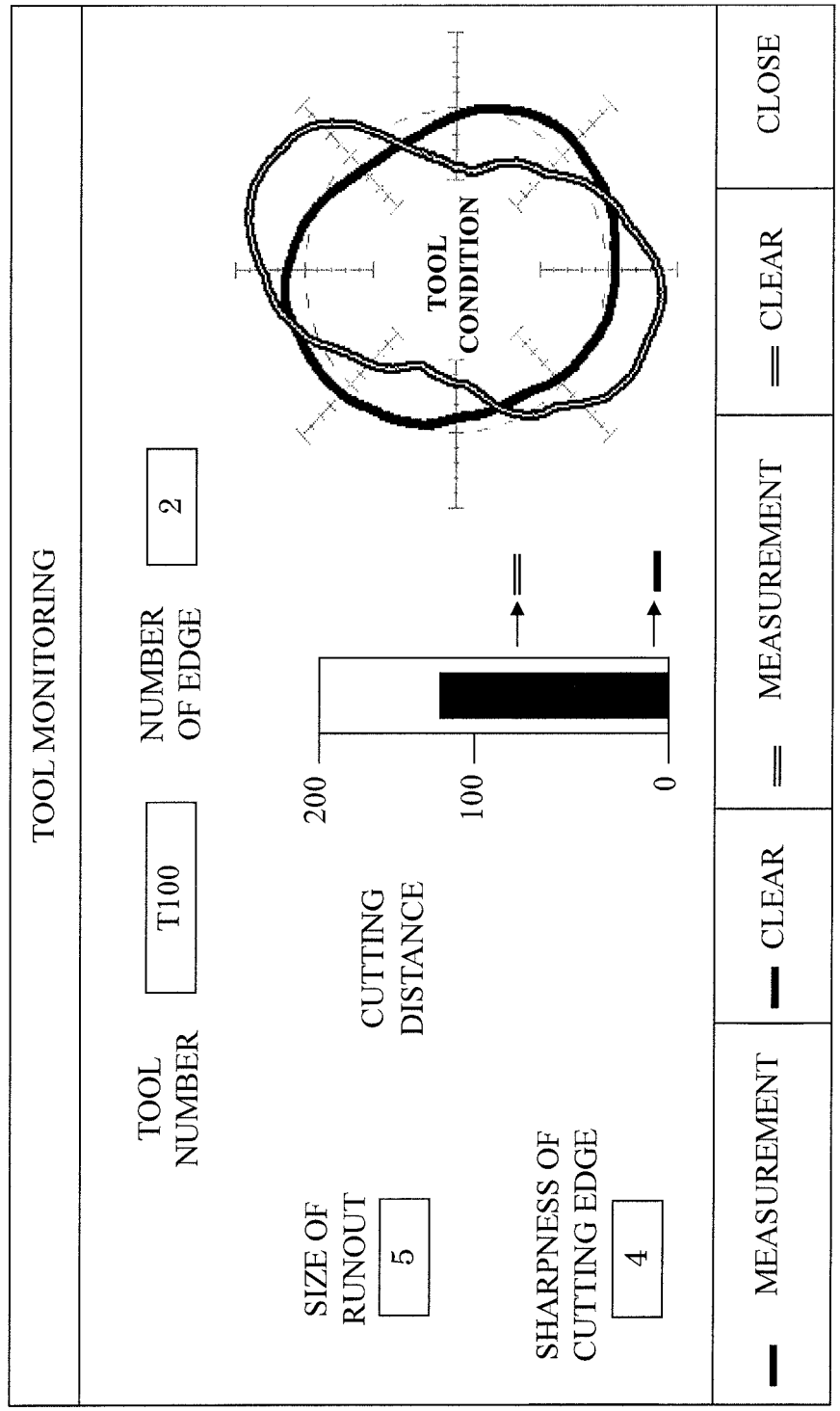
FIG. 9 is an explanatory drawing illustrating a main spindle load monitor screen.

FIG. 9 is an exemplary main spindle load monitor screen indicated on the display screen 19. Here, a plurality of waveforms recorded in the storage unit 20 are overlapped on the polar coordinates indication of the main spindle load to be displayed. In FIG. 9, the time course is indicated in association with a cutting distance. Furthermore, the number of the edge is indicated on the identical screen together, and therefore, it is easy to grasp the tool condition by the shape of the main spindle load. FIG. 9 indicates the index of the runout of the tool as "a size of the runout" (as the numeral is larger, the runout is larger), and the index of the damage of the cutting edge as "a sharpness of the cutting edge" (as the numeral is larger, the damage is larger).

The display screen 19 includes a "measurement" button and a "clear" button on the lower portion. The "measurement" button is for measuring the main spindle load with a press operation at an arbitrary timing and storing the main spindle load to display in polar coordinates system. The "clear" button is for deleting the polar coordinates indication indicated by the press operation.

Thus, the NC system 11 with the above-described configuration includes the main spindle load detector 17 that detects the load on the main spindle 6 and the main spindle load processing unit 18 that converts the time course of the main spindle load detected by the main spindle load detector 17 into the change of the main spindle load with respect to the main spindle rotation angle, and indicates the value of the converted main spindle load on the display screen 19 in the polar coordinates system. Therefore, it is not necessary to obtain the processing load by a test cutting in advance. Further, since the change of the main spindle load is indicated with the polar coordinates, it is easy to grasp the state of the load on the main spindle 6.

Especially, the NC system 11 indicates the degrees of the runout and the damage of the tool on the main spindle load monitor screen by numerical values, which can be used for the determination whether or not the process of this time is performed normally.

Additionally, the main spindle load monitor screen indicates the plurality of the main spindle loads that are sequentially recorded while overlapping. Therefore, it is easy to grasp the time course of the main spindle load.

The disclosure is not limited to the above-described embodiment. The following configurations may be employed. In one configuration as an example, the main spindle load processing unit individually includes a conversion unit (a main spindle load conversion unit) that converts the time course of the main spindle load into the change of the main spindle load with respect to the main spindle rotation angle and develops the result of the conversion by Fourier series to extract the Fourier coefficient, and a screen creating unit (a display control unit) that creates the main spindle load monitor screen. The configuration of the spindle and similar configuration according to the whole machine tool can be modified as necessary without departing from the spirit of the disclosure.

While in the above-described embodiment the NC system is employed to achieve the main spindle load monitoring device to display the main spindle load monitor screen on the display screen of the NC system, at least the main spindle load conversion unit, the display control unit, and the display screen may be disposed in an external device (such as a personal computer), which is disposed separately from the NC system and coupled to the NC system by wire or wirelessly, to monitor the main spindle load by the external device. This ensures the main spindle loads of a plurality of machine tools to be controlled by the external device on one place.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A main spindle load monitoring device for indicating a main spindle load in a machine tool that includes a tool with a plurality of edges on a main spindle and performs a process of a workpiece while the tool rotates with the main spindle, the main spindle load monitoring device comprising:
   a main spindle load detecting unit configured to detect a load on the main spindle;
   a main spindle load conversion unit configured to detect magnitudes of loads on the main spindle at each of a plurality of main spindle rotation angles, each of said main spindle rotation angles at a respective different angular position of the main spindle with respect to an axis of rotation of the main spindle; and
   a display control unit configured to plot said magnitudes of loads on a polar coordinates system based on respective main spindle rotation angle values for said magnitudes of loads.

2. The main spindle load monitoring device according to claim 1, wherein:
   the main spindle load conversion unit is configured to normalize the change of the main spindle load with respect to the main spindle rotation angle, develops the normalized change by Fourier series to exclude a zero-order component and a primary component, and extracts a Fourier coefficient of the primary component and a Fourier coefficient of an n-order component as the number of edge, and the display control unit is configured to indicate the Fourier coefficient of the primary component as an index of runout of a tool, and the Fourier coefficient of the n-order component as an index of damage of the edge on the display screen.

3. The main spindle load monitoring device according to claim 1, further comprising a storage unit configured to sequentially store values of the main spindle load of the polar coordinates system, wherein the display control unit is configured to indicate a plurality of the stored main spindle loads while overlapping on the display screen.

4. The main spindle load monitoring device according to claim 2, further comprising a storage unit configured to sequentially store values of the main spindle load of the polar coordinates system, wherein the display control unit is configured to indicate a plurality of the stored main spindle loads while overlapping on the display screen.

* * * * *